R. T. NEWTON.
SHOCK ABSORBER.
APPLICATION FILED FEB. 2, 1918.
1,306,558.  Patented June 10, 1919.
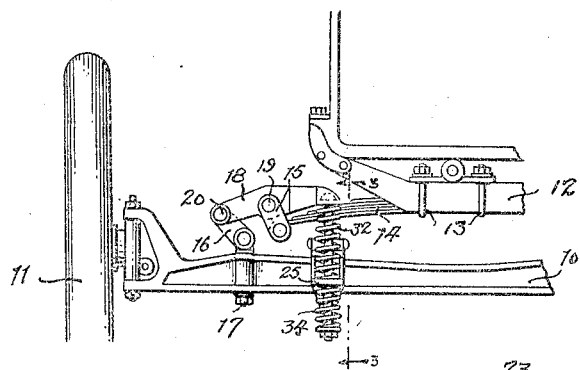
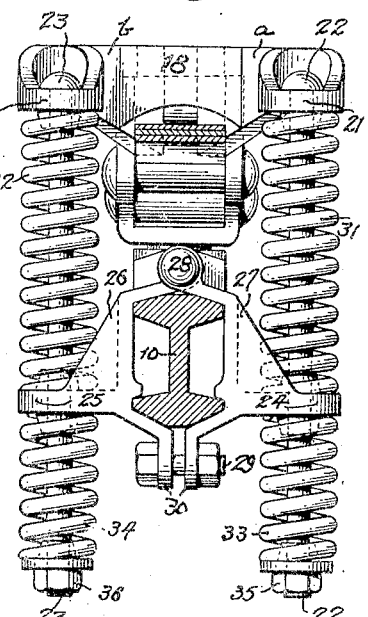
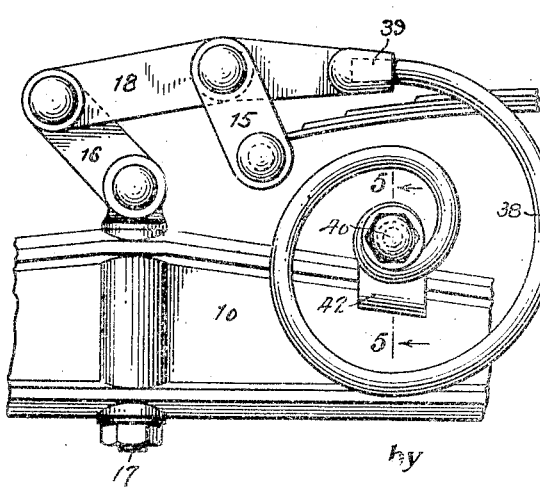
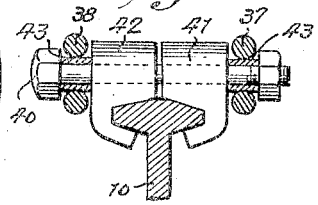
Inventor:
RICHARD T. NEWTON
by
Attys.

UNITED STATES PATENT OFFICE.

RICHARD T. NEWTON, OF NEW YORK, N. Y.

SHOCK-ABSORBER.

1,306,558. Specification of Letters Patent. Patented June 10, 1919.

Application filed February 2, 1918. Serial No. 215,176.

*To all whom it may concern:*

Be it known that I, RICHARD T. NEWTON, a citizen of the United States of America, residing in the city, county, and State of New York, have invented certain new and useful Improvements in Shock-Absorbers, of which the following is a specification.

My invention relates to shock absorbers and particularly to a shock absorber for automobiles, the object of my invention being to provide a relatively simple and efficient construction adapted to be operatively interposed between the usual supporting spring and chassis, where said spring is arranged transversely of the longitudinal axis of the chassis, as is the case in the well known Ford car.

In the accompanying drawings,

Figure 1 is a front elevation of portion of an automobile to which my invention is applied in one form;

Fig. 2 is a plan, drawn to a larger scale, of the present shock absorber in one form;

Fig. 3 is a section on the line 3—3, Fig. 1;

Fig. 4 is a front elevation of a modified shock absorber spring construction; and Fig. 5 is a section on the line 5—5, Fig. 4.

In the construction illustrated in Figs. 1 to 3, the automobile chassis comprises the usual cross bar 10 at the front end of the car, and upon which is secured the mounting for the wheel 11. The automobile body frame 12 is secured by clips 13 to a leaf spring 14, lying above the chassis cross bar 10 and normally connected thereto by a pair of links 15 and 16, the upper ends of which are commonly jointed together and the lower end of one of which—viz. 15—is jointed to the end of the spring 14, while the lower end of the other link—viz. 16—is jointed to the eye of a bolt 17 which engages the chassis cross bar 10. A flexible connection is thus established between the spring and the chassis which permits the spring 14 to flex freely while, at the same time, rigidly connected to the chassis. In order to withstand severe shocks to which the car may be subjected when passing over rough roads, the spring 14 must be made relatively rigid, which prevents a soft and easy riding of the car when passing over slight irregularities in the roadway. The object of the present invention is to provide a supplemental spring suspension which will take up the lighter jolts and stresses and thus cushion the action of the heavier supporting spring 14 to give an easy ride for the car body.

As here shown, the present shock absorber comprises a lever 18 pivoted intermediate its ends at 19 to the link 15, and jointed at one end at 20 to the link 16. The lever 18 preferably comprises two branches *a* and *b* which straddle the spring 14 and are provided, at their spaced ends, with sockets 21—21, in which are seated the heads of spring guide pins 22—23. The latter pass down through perforated guide flanges 24—25, forming portion of bracket arms 26—27, pivoted together at 28 and clamped upon the chassis bar 10 by a bolt 29 passing through lugs 30 at the lower end of the bracket arms. Confined between the seats 20—21 and the flanges 24—25 of the bracket are cushioning coil springs 31—32. Beneath the flanges 24—25 of the bracket are rebound springs 33—34 coiled upon the downwardly extended ends of the guide pins 22—23 and confined by the nuts 35—36 which screw upon the lower ends of the guide pins.

The operation of the shock absorber is readily understood. When the chassis cross bar 10 is thrust upward by a bump in the road, the lifting of the link 16 tilts the inner end of the lever 18 downward against the action of the springs 31—32, the fulcrum 19 of the lever remaining practically quiescent, and the spring 14 substantially unflexed, unless the bump is a severe one. If the spring 14 is flexed, however, through a severe shock to the car, there is a tendency for this spring to give an upthrow to the car body. This would cause a jolt to the car body were the motion in this direction not opposed by a take-up spring. It will be seen, however, that when the spring 14 throws the car upward, the lever 18, now fulcruming about the center 20, moves upward against the action of the rebound springs 33—34 and thus opposes excessive motion in the direction indicated.

In Figs. 4 and 5 I have shown a shock absorber of different construction, in that, in place of a pair of coil springs such as indicated in Figs. 1 to 3, I use a pair of spiral springs 37—38, the upper ends of which are held in sockets 39 in the free ends of the spaced arms *a* and *b* of the lever 18, while the inner ends of the spirals are mounted on a bolt 40 which passes through bracket arms 41—42 and holds the same in engagement with the top flange of the eye-shaped chassis bar 10. Spacing sleeves 43 may be interposed between the brackets 41—42 and the heads of the bolt 40 to give the spring ends freedom of oscillation on the bolt 40.

In both arrangements the construction is not only extremely simple and inexpensive, but entails nothing more than clamping a bracket to the chassis front bar 10 and connecting the lever 18 at its two pivot points 19—20 to the upper ends of the links 15—16, which are commonly used in the mounting of the leaf spring 14 upon the chassis. No special construction or alteration of the chassis is required, nor is the latter in any way weakened by the drilling of bolt holes or the like. The present device is inconspicuous and yet perfectly efficient and affords considerable range of adjustment for the tension of the springs 31 to 34 by the simple expedient of tightening up the nuts 35—36.

I do not limit my invention to the precise form of construction indicated, which may be variously modified without departing from what I claim as my invention.

I claim:—

1. A vehicle comprising a chassis and a body resiliently supported thereon, said resilient support comprising a leaf spring carried by the body, a lever, one end of which straddles an end of the leaf spring, a link connecting the opposite end of the lever to the chassis, a second link connecting the lever, intermediate its ends, to the end of the leaf spring, and a pair of cushioning springs interposed between the free end of the lever and the chassis element, substantially as described.

2. A vehicle comprising a chassis and a body resiliently supported thereon, said resilient support comprising a leaf spring carried by the body, a lever, one end of which straddles an end of the leaf spring, a link connecting the opposite end of the lever to the chassis, a second link connecting the lever, intermediate its ends, to the end of the spring, an abutment member rigidly clamped to the chassis beneath the spring straddling end of the lever, and a pair of cushioning springs lying on opposite sides of the leaf spring and engaged between the abutment member clamped on the chassis and the overlying end of the lever.

3. A vehicle comprising a chassis and a body resiliently supported thereon, said resilient support comprising a leaf spring carried by the body, a lever, one end of which straddles an end of the leaf spring, a link connecting the opposite end of the lever to the chassis, a second link connecting the lever, intermediate its ends, to the end of the spring, an abutment member rigidly clamped to the chassis beneath the spring straddling end of the lever, and a pair of cushioning springs lying on opposite sides of the leaf spring and engaged between the abutment member clamped on the chassis and the overlying end of the lever, together with guide bolts extending from said lever end through the abutment member clamped on the chassis and rebound cushioning springs interposed between the lower ends of said bolts and the abutment member, substantially as described.

In testimony whereof I have signed my name to this specification.

RICHARD T. NEWTON.